United States Patent [19]
Eckstein

[11] Patent Number: 5,888,586
[45] Date of Patent: Mar. 30, 1999

[54] USE OF A WATER-CONTAINING FIRE-RESISTANT CERAMIC CASTING MATERIAL

[75] Inventor: Wilfried Eckstein, Trofaiach, Austria

[73] Assignee: Veitsch-Radex Aktiengesellschaft Fur Feuerfeste Erzeugnisse, Wien, Austria

[21] Appl. No.: 952,757

[22] PCT Filed: May 4, 1996

[86] PCT No.: PCT/EP96/01865

§ 371 Date: Nov. 18, 1997

§ 102(e) Date: Nov. 18, 1997

[87] PCT Pub. No.: WO96/36578

PCT Pub. Date: Nov. 21, 1996

[30] Foreign Application Priority Data

May 19, 1995 [DE] Germany .................. 195 18 468.8

[51] Int. Cl.⁶ ..................................................... B05D 7/22

[52] U.S. Cl. .......................... 427/142; 427/140; 427/230; 427/287

[58] Field of Search ...................................... 427/140, 230, 427/142, 287

[56] References Cited

U.S. PATENT DOCUMENTS 5,512,316  4/1996  Dody et al. .............................. 427/140
5,646,079  7/1997  Eckstein .................................. 427/230

*Primary Examiner*—Janyce Bell
*Attorney, Agent, or Firm*—John F. A. Earley; John F. A. Earley, III; Harding, Earley, Follmer & Frailey

[57] ABSTRACT

The invention concerns a use for a water-containing refractory ceramic cast material based on a hydration-sensitive metal oxide such as MgO and containing carbon, a dispersing agent and a reactive silicic acid for forming a monolithic lining for a metallurgical smelting vessel.

16 Claims, No Drawings

USE OF A WATER-CONTAINING FIRE-RESISTANT CERAMIC CASTING MATERIAL

The invention concerns the use of a water-containing refractory ceramic casting material on the basis of a metal oxide being susceptible to hydration, such as MgO, particularly in the form of sintered magnesia.

Magnesia carbon bricks (MgO-C-bricks) have been used successfully for a long time as refractory lining in aggregates for the production of steel. These bricks mainly consist of magnesia (MgO), particularly in the form of sintered or fused magnesia and carbon. They are used in their unfired condition at application temperatures of up to 1800° C. Their main characteristics are an excellent temperature change behaviour, an excellent caloric conductibility and particularly a good resistance to aggressive slags. The necessary compact structure of magnesite and carbon is influenced considerably by the used binder.

A method for producing MgO-C-bricks is described in the DE 42 07 249 C1, an aliphatic organic polymer compound being used as a binder. Such a binder is characterized in that the organic part decomposes at higher temperatures without residue and without pollutant emissions. At most, there remain harmless inorganic residues.

Such bricks are used in the slag zone of pouring ladles, as can be gathered from "Veitsch-Radex Rundschau", No. 1-2/1994, 494, among others. While otherwise the ladle lining is realized monolithicly, the said MgO-C-bricks have been used in the region of the slag zone in order to bring the stability of the refractory lining in this region particularly endangered by the aggressive metallurgical slags to about the same level as in the monolithicly lined portions. It is an object of the invention to present a possibility according to which also the wall regions endangered by erosion, especially the slag region, can be lined monolithicly with a refractory casting material.

Here, the use of materials having the recipe disclosed in the DE 42 07 249 C1 is out of the question, because the magnesite component is very susceptible to hydration and would lead to a hydration of the magnesia (MgO) in adding water as is absolutely necessary in a casting material. This is the reason why MgO-C-bricks fabricated under dry conditions are used in the region of the slag zone according to "Veitsch-Radex Rundschau"D (loc cit.).

With the present invention, we succeded in providing a water-containing refractory ceramic casting material on the basis of a metal oxide being susceptible to hydration, as MgO, with a carbon content from 3 to 10% by wt., in which a hydration of the MgO is prevented—in spite of the water content.

The invention is based on the realization that two additional features are necessary for that. Firstly, the carbon component needs to be sufficiently dispersed within the casting material. This is achieved by adding a dispersing agent in an amount of 0.1 to 2.0% by wt, based on the solids content of the material.

By this measure the hydrophilizing treatment of the carbon being absolutely necessary in the prior art according to the DE 43 17 383 A1 is omitted.

Moreover, the casting material comprises a reactive silicic acid in an amount of 1.0 to 10.0% by wt., again based on the solids content of the material. The silicic acid which, as an example, may be added in the form of micro silica is substantially responsible for preventing a hydration of the sintered magnesia.

According to this, the invention in its most general embodiment concerns the use of a water-containing refractory ceramic casting material on the basis of a metal oxide being susceptible to hydration, such as MgO, having a carbon content of 3 to 10% by wt., a dispersing agent in an amount of 0.1 to 2.0% by wt. and a reactive silicic acid in an amount of 1.0 to 10.0% by wt., each on the basis of the solids content of the material, for monolithicly lining or repairing a metallurgical melting vessel, such as a pouring ladle, particularly its zones being endangered by erosion.

The described casting material may be fed behind a corresponding template by charging under vibration—as is described in "Veitsch-Radex Rundschau" (loc cit.) with high-alumina casting materials as an example. The refractory lining of a metallurgical melting vessel may be realized—either totally or partly—with the described casting material. Accordingly, the separate lining of the slag region with MgO-C-bricks may be replaced by a monolithic lining. Obviously, advantages in the lining technique result therefrom. The described monolithic casting material reaches almost those stabilities as are reached with the said MgO-C-bricks.

Therefore, it is not any longer necessary to use moulded magnesia carbon products which are produced from dry raw materials by applying high pressures, according to the moulding technology. Rather, similarly high relative densities are achieved only by vibration (or ramming) as with the said moulded products. Also the porosities being attainable by means of the monolithic lining technique are exceptionally low with 10 to 12%, for example.

In the low temperature range (up to about 300° C.), the dispersed carbon being substantially responsible to the stability of the material. At higher temperatures (above 700° C.), a continuous ceramic bond of the material is realized, which is supported substantially by the content of reactive silicic acid.

The carbon needs no extra treatment that is needs not to be formed having a hydrophilic coating as is still proposed in DE 43 17 383 A1, for example.

A coating (hydrophobizing) of the MgO component against hydration may be omitted as well.

The carbon carrier is introduced in the form of carbon black and/or graphite, for example. The carbon carrier should have a particle size of 1.0 to 500 $\mu$m (preferably 10 to 300 $\mu$m). In the presence of the mixing water (typically 3 to 8% by wt. on the basis of the solids content of the material) the dispersing agent leads to a dispersion of possible carbon agglomerates and thus to a homogeneous fine-particle preparation of the carbon carrier within the casting material. Assuming the proportions mentioned above in the said range, a mixing water content of about 6% by wt. (5 to 7% by wt.) will usually be sufficient.

The separate addition of a binding agent, particularly a cement, can be omitted completely in the described material. However, other additives as calcined alumina, silicon carbide, metals, especially Si, but also further oxides such as zirconium dioxide ($ZrO_2$), $ZrSiO_4$ or the like can be added to the material, their content, however, should usually not exceed 5.0% by wt. in total, on the basis of the solids content of the material.

As a dispersing agent such additives can he used as cause a good dispersing effect with regard to the carbon particles.

This also includes polymeric compounds in the form of polyacrylates, polycarboxylic acids, polyvinylic compounds, polyvinylic acids, polyalcohols or the like.

The reactive silicic acid may be introduced in dry or liquid state. According to an embodiment, the reactive silicic acid is present in the form of so-called micro silica or as silica gel or silica sol.

Further characteristics of the invention follow from the features of the subclaims as well as from the other application documents.

In the following, the invention is described in detail with an embodiment.

Starting from a refractory matrix material based on sintered magnesite, a casting material is prepared by homogeneously mixing the components after the addition of 7% by wt. of graphite (less than 500 μm), 0.5% by wt. of polyacrylic acid and 3.0% by wt. of micro silica as well as 6% by wt. of water.

The casting material is introduced between a permanent refractory lining of a pouring ladle and a template being disposed in front of it and by means of a vibration technique.

The bulk density, the open porosity, the cold bending strength (CBS) and the cold compression strength (CCS) at 180° C., 1000° C. and 1500° C. (under reducing conditions), which are determined accordingly, are indicated in the following table:

| After 180° C. | bulk density (g/cm³) | 2.70 |
|---|---|---|
| | open porosity (% by vol.) | 11.0 |
| | CBS (N/mm²) | 17.0 |
| | CCS (N/mm²) | 70 |
| after 1000° C. | bulk density (g/cm³) | 2.73 |
| | open porosity (% by vol.) | 12.2 |
| | CBS (N/mm²) | 12.8 |
| | CCS (N/mm²) | 69 |
| after 1500° C. | bulk density (g/cm³) | 2.75 |
| | open porosity (% by vol.) | 10.2 |
| | CBS (N/mm²) | 11.5 |
| | CCS (N/mm²) | 51.0 |

The described material may also be used, and this is an essential feature, for repairing (so-called relining) of refractory linings in metallurgical furnaces. In using the said material it is therefore not any longer necessary to break off worn moulded bricks and to replace them; rather, the corresponding wear lining may be repaired (restored) repeatedly by applying a new monolithic outer layer in the described manner.

I claim:

1. A method of using a water-containing refractory ceramic casting material on the basis of a metal oxide being susceptible to hydration, presenting a carbon content of 3 to 10% by wt., a dispersing agent in the amount of 0.1 to 2.0% by wt. and a reactive silicic acid in an amount of 1.0 to 10% by wt., each on the basis of the solids content of the material, for monolithicly lining or repairing of a metallurgical melting vessel.

2. The method of using according to claim 1, wherein carbon black and/or graphite is used as the carbon carrier.

3. The method of using according to claim 1, wherein the carbon carrier is used with a particle size of 1 to 500 μm.

4. The method of using according to claim 1 with the proviso that the mixing water content is 3 to 8% by wt.

5. The method of using according to claim 4 with the proviso that the mixing water content is 5 to 7% by wt.

6. The method of using according to claim 1 with the proviso that micro silica, silica sol and/or silica gel is used as the reactive silicic acid.

7. The method of using according to claim 1 with the proviso that the reactive silicic acid is used in an amount of 2.0 to 6.0% by wt.

8. The method of using according to claim 1 with the proviso that a polymeric compound in the form of polyacrylates, polycarboxylic acids, polyvinylic compounds, polyvinylic acids and/or polyalcohols is used as dispersing agent.

9. The method of using according to claim 1 with the proviso that sintered and/or fused magnesia is used as a metal oxide being susceptible to hydration.

10. The method of using according to claim 1 with the proviso that the metal oxide being susceptible to hydration is used in a grain size fraction up to 6 mm.

11. The method of using according to claim 1 with the proviso that other additives in the form of calcined alumina, silicon carbide, metals, and other refractory oxides are added to the casting material in a total amount of less than 5.0% by wt. on the basis of the solids content of the material.

12. The method of using according to claim 11 with the proviso that other additives in the form of silicium.

13. The method of using according to claim 11 with the proviso that other additives in the form of other refractory oxides are $ZrO_2$ and/or $ZrSiO_4$.

14. The method of using according to claim 1, wherein MgO is used as the metal oxide.

15. The method of using according to claim 1 for monolithicly lining or repairing zones of said metallurgical vessel being endangered by erosion.

16. A method of monolithicly lining or repairing a metallurgical melting vessel in zones, being endangered by erosion, comprising the steps of providing a water-containing refractory ceramic casting material on the basis of a metal oxide being susceptible to hydration, presenting a carbon content of 3 to 10% by wt., a dispersing agent in the amount of 0.1 to 2.0% by wt. and a reactive silicic acid in an amount of 1.0 to 10.0% by wt., each on the basis of the solids content of the material, and applying said material to the metallurgical melting vessel, wherein MgO is used as the metal oxide, wherein carbon black, and/or graphite is used as the carbon carrier, wherein a carbon carrier is used with a particle size of 1 to 500 μm., wherein the material has a mixing water content in an amount of 5 to 7% by wt. of the material, wherein the reactive silicic acid comprises micro silica, silica soil and/or silica gel, wherein the reactive silicic acid is in the amount of 2.0 to 6.0% by wt. of the material, wherein the dispersing agent comprises a polymeric compound in the form of polyacrylates, polycarboxylic acids, polyvinylic compounds, polyninylic acids and/or polyalcohols, where sintered and/or fused magnesia is used as a metal oxide susceptible to hydration, wherein the metal oxide susceptible to hydration has a grain size fraction up to 6 mm, and wherein the material further comprises other additives in the form of calcined alumina, silicon carbide, metals, other refractory oxides in an amount of less than 5.0% by wt. on the basis of the solids content of the material, wherein said additives in the form of metals are silicium, wherein said additives in the form of other refractory oxides are $ZrO_2$ and/or $ZrSiO_4$.

* * * * *